(12) United States Patent
Paukner

(10) Patent No.: US 11,002,199 B2
(45) Date of Patent: May 11, 2021

(54) METHOD AND DEVICE FOR THE EXHAUST-GAS AFTERTREATMENT OF AN INTERNAL COMBUSTION ENGINE

(71) Applicant: VOLKSWAGEN AKTIENGESELLSCHAFT, Wolfsburg (DE)

(72) Inventor: Stefan Paukner, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 132 days.

(21) Appl. No.: 15/755,884

(22) PCT Filed: Aug. 31, 2016

(86) PCT No.: PCT/EP2016/070472
§ 371 (c)(1),
(2) Date: Aug. 9, 2018

(87) PCT Pub. No.: WO2017/037093
PCT Pub. Date: Mar. 9, 2017

(65) Prior Publication Data
US 2018/0334972 A1    Nov. 22, 2018

(30) Foreign Application Priority Data

Sep. 3, 2015  (DE) ..................... 10 2015 216 830.1

(51) Int. Cl.
*F02D 41/00*  (2006.01)
*F01N 3/10*   (2006.01)
(Continued)

(52) U.S. Cl.
CPC ..... *F02D 41/0007* (2013.01); *B01D 53/9495* (2013.01); *F01N 3/101* (2013.01);
(Continued)

(58) Field of Classification Search
CPC .......... F02D 41/00; F02D 41/30; F02D 13/02; F02D 41/14; F01N 3/10; F01N 3/20;
(Continued)

(56) References Cited

U.S. PATENT DOCUMENTS 6,324,839 B1 * 12/2001 Canini ................. F01N 13/008
                                                    60/323
8,165,787 B2    4/2012 Reed et al.
(Continued)

FOREIGN PATENT DOCUMENTS

CN        104508284 A     4/2015
CN        104718366 A     6/2015
(Continued)

OTHER PUBLICATIONS

JP 2008-128046, Machine Translation, Translated on Oct. 29, 2019.*
(Continued)

*Primary Examiner* — Ngoc T Nguyen
(74) *Attorney, Agent, or Firm* — Pearl Cohen Zedek Latzer Baratz LLP

(57) ABSTRACT

The invention relates to a method for the exhaust-gas aftertreatment of an internal combustion engine (10), and to an internal combustion engine (10) having an exhaust-gas aftertreatment device for carrying out a method of said type. The internal combustion engine (10) is supplied with fresh air by way of a compressor (18), has an adjustable valve control means (12) for the inlet valves (14) and/or the outlet valves (16), and is connected to an exhaust duct (20), wherein, in the exhaust duct (20), there is arranged a first three-way catalytic converter (24), and an injection valve (26) for introducing fuel into the exhaust duct (20) is arranged, as viewed in the flow direction of an exhaust gas of the internal combustion engine (10), downstream of an (Continued)

outlet (22) of the internal combustion engine (10) and upstream of the first three-way catalytic converter (24). The method comprises the following steps:—operating the internal combustion engine (10) in a scavenging mode,—introducing a superstoichiometric exhaust gas into the exhaust duct (20),—metering fuel into the exhaust duct (20) upstream of the first three-way catalytic converter (24) such that a stoichiometric exhaust gas is realized at the inlet of the first three-way catalytic converter (24), and—performing aftertreatment of the stoichiometric exhaust gas by way of the first three-way catalytic converter (24).

7 Claims, 2 Drawing Sheets

(51) Int. Cl.
F01N 3/20 (2006.01)
F01N 13/00 (2010.01)
F02D 41/14 (2006.01)
F02D 13/02 (2006.01)
F02D 41/02 (2006.01)
B01D 53/94 (2006.01)

(52) U.S. Cl.
CPC ........... F01N 3/206 (2013.01); F01N 3/2033 (2013.01); F01N 13/0093 (2014.06); F02D 13/0261 (2013.01); F02D 41/025 (2013.01); F02D 41/0245 (2013.01); F02D 41/1454 (2013.01); F01N 2610/03 (2013.01); F02D 2041/001 (2013.01); Y02T 10/12 (2013.01)

(58) Field of Classification Search
CPC .... F01N 13/0093; F01N 3/101; F01N 3/2033; F01N 3/203; F01N 3/035; F01N 11/007; F01N 2610/03; B02D 53/94
See application file for complete search history.

(56) References Cited

U.S. PATENT DOCUMENTS

| 2001/0037643 | A1* | 11/2001 | Kubo | F01N 3/0871 60/301 |
| 2006/0021325 | A1* | 2/2006 | Ikemoto | F02D 41/1456 60/276 |
| 2009/0070014 | A1* | 3/2009 | Miyashita | F02D 13/0261 701/105 |
| 2009/0145113 | A1* | 6/2009 | Yoshida | F01N 13/0093 60/285 |
| 2010/0263639 | A1* | 10/2010 | Uhrich | F02D 41/0007 123/564 |
| 2011/0072787 | A1* | 3/2011 | Hubbard | F01N 3/0253 60/276 |
| 2011/0167802 | A1* | 7/2011 | Bruck | F02D 41/029 60/274 |
| 2012/0031074 | A1* | 2/2012 | Frank | F01N 3/101 60/274 |
| 2013/0047589 | A1 | 2/2013 | Bisaiji | |
| 2014/0000554 | A1 | 1/2014 | Tsuyuki et al. | |
| 2014/0331651 | A1 | 11/2014 | Nishikori | |
| 2015/0260068 | A1 | 9/2015 | Kuenzel | |
| 2015/0275801 | A1 | 10/2015 | Nagaoka et al. | |
| 2016/0348601 | A1* | 12/2016 | Okubo | F02B 33/40 |
| 2016/0356226 | A1* | 12/2016 | Kimura | F02D 13/0261 |

FOREIGN PATENT DOCUMENTS

| DE | 10 2004 001 249 A1 | 8/2005 | |
| DE | 102012021573 A1 * | 5/2014 | ............. F23N 1/025 |
| DE | 11 2012 001 097 T5 | 7/2014 | |
| DE | 10 2013 202 196 A1 | 8/2014 | |
| DE | 10 2013 008826 A1 | 11/2014 | |
| DE | 10 2013 218 581 A1 | 3/2015 | |
| EP | 2 053 214 A1 | 4/2009 | |
| EP | 2 192 285 A1 | 6/2010 | |
| EP | 2192285 A1 | 6/2010 | |
| EP | 2 453 117 A1 | 5/2012 | |
| EP | 2453117 A1 | 5/2012 | |
| EP | 2 559 872 A1 | 2/2013 | |
| EP | 2 787 203 A1 | 10/2014 | |
| EP | 2 848 783 A1 | 3/2015 | |
| EP | 3 103 984 A1 | 12/2016 | |
| EP | 3103984 A1 | 12/2016 | |
| JP | 2008-128046 A | 6/2008 | |
| JP | 2008128046 A * | 6/2008 | |
| RU | 2012 113 124 A | 10/2013 | |
| WO | WO 2005/093235 A1 | 10/2005 | |

OTHER PUBLICATIONS

Machine generated translation of DE-102012021573-A1 obtained from EPO.*
Office Action for European Patent Application No. 16 757 919.2-1007, dated Jul. 16, 2018.
Search Report for Russian Patent Application No. 2018111700/07, completed Nov. 11, 2018.
International Search Report of PCT Application No. PCT/EP2016/070472, dated Nov. 10, 2016.
Search report for German Patent Application No. 10 2015 216 830.1, dated Apr. 25, 2016.
Office Action for Chinese Patent Application No. 201680057404.1, dated May 26, 2020.
Office Action for Chinese Patent Application No. 201680057404.1, dated Dec. 28, 2020.

* cited by examiner

METHOD AND DEVICE FOR THE EXHAUST-GAS AFTERTREATMENT OF AN INTERNAL COMBUSTION ENGINE

CROSS-REFERENCE TO RELATED APPLICATIONS

This application is a National Phase Application of PCT International Application No. PCT/EP2016/070472, International Filing Date Aug. 31, 2016, claiming priority of German Patent Application No. 10 2015 216 830.1, filed Sep. 3, 2015, which is hereby incorporated by reference in its entirety.

BACKGROUND OF THE INVENTION

The present invention relates to a method as well as to a device for the exhaust-gas aftertreatment of an internal combustion engine, according to the independent claims.

Legislation on exhaust-gas emissions is becoming ever-more stringent and also calling for the further optimization of fuel consumption, and consequently, the automotive industry has to meet these high requirements by taking appropriate steps to reduce the raw emissions of engines as well as by implementing appropriate exhaust-gas aftertreatment. Downsizing is being pursued in order to reduce fuel consumption, whereby smaller engines with less cubic capacity and/or fewer cylinders but which still yield a comparable performance are being used, so that the friction in the combustion chamber as well as the weight of the internal combustion engine can be reduced. The drop in performance that is primarily associated with this is often compensated for by supercharging the engine by means of a turbocharger. When it comes to small, supercharged engines, it becomes a challenge to achieve a high torque at low rotational speeds (the so-called low-end torque). Scavenging constitutes a method for increasing the torque. In this process, the opening times of the intake valves and exhaust valves overlap, so that, in the case of a positive scavenging gradient, some of the fresh air pushes the exhaust gas present in the cylinder into the exhaust manifold, as a result of which the filling of the combustion chamber is considerably improved in comparison to conventional modes of operation without valve overlapping. Owing to the increased mass flow in the exhaust gas duct, an increased rotational speed of the turbocharger allows a higher boost pressure to be established, especially at low rotational speeds. With an effective scavenging, however, a leaner-than-stoichiometric exhaust gas is established, that is to say, an excess of oxygen prevails in the exhaust gas duct, causing the function of the three-way catalytic converter to be impaired and leading to elevated nitrogen oxide emissions ($NO_x$ emissions). In view of the Real Driving Emissions (RDE) legislation currently under discussion, the operating points at low rotational speeds and high loads are likewise relevant for the certification and approval of engines and motor vehicles, making an exhaust-gas aftertreatment step necessary for the scavenging operation of an internal combustion engine.

German patent application DE 10 2013 202 196 A1 discloses a method for the exhaust-gas aftertreatment in a motor vehicle with a hybrid concept consisting of an internal combustion engine and an electric motor in which the internal combustion engine is operated in a scavenging mode, at least during certain phases, a process in which the oxygen from the leaner-than-stoichiometric exhaust gas is briefly stored in the three-way catalytic converter in order to prevent a breakthrough of nitrogen oxide emissions ($NO_x$ emissions), and the internal combustion engine is periodically operated with a rich, richer-than-stoichiometric mixture by closing the exhaust valves in order to remove the oxygen that has been stored in the three-way catalytic converter. However, this, in turn, reduces the positive effect of raising the torque at low rotational speeds.

Before this backdrop, the invention is based on the objective of raising the torque at low rotational speeds while, at the same time, making it possible to attain a highly efficient exhaust-gas aftertreatment by means of the three-way catalytic converter.

SUMMARY OF THE INVENTION

This objective is achieved by a method for the exhaust-gas aftertreatment of an internal combustion engine, whereby the internal combustion engine is supplied with fresh air by means of a compressor and it has an adjustable valve control unit for the intake valves and/or exhaust valves. The internal combustion engine is also connected to an exhaust gas duct, whereby a first three-way catalytic converter is arranged in the exhaust gas duct, and an injection valve that serves to feed fuel into the exhaust gas duct is arranged downstream from the outlet of the internal combustion engine and upstream from the first three-way catalytic converter, in the direction of flow of the exhaust gas of the internal combustion engine through the exhaust gas duct. The method encompasses the following steps:
- operating the internal combustion engine in the scavenging mode,
- introducing a leaner-than-stoichiometric exhaust gas into the exhaust gas duct,
- metering fuel into the exhaust gas duct upstream from the first three-way catalytic converter so that a stoichiometric exhaust gas is established at the inlet of the first three-way catalytic converter,
- aftertreating the stoichiometric exhaust gas by means of the first three-way catalytic converter.

The term "scavenging mode of operation of the internal combustion engine" refers to a mode of operation in which the opening times of the intake valves and/or exhaust valves of the internal combustion engine are regulated in such a way that the opening times of the intake valves overlap with those of the exhaust valves (so-called valve overlapping). Here, the intake valves are already opened at a time when the exhaust valves have not yet been closed. It goes without saying that the scavenging mode of operation of the internal combustion engine can be provided along with other modes of operation, especially those without valve overlapping, and they can be carried out as a function of prescribed conditions, especially as a function of an operating point of the internal combustion engine. In this context, an adjustable valve control unit is, for example, a camshaft timing control unit by means of which the opening times of the intake valves and/or exhaust valves can be changed with respect to each other. Therefore, the overlapping of the opening times of the intake valves and exhaust valves that is necessary for the scavenging mode of operation can be achieved, for instance, at low rotational speeds. By adjusting the camshaft timing control unit, it is possible to prevent overlapping of the opening times of the intake valves and exhaust valves at other operating points, for example, at high rotational speeds and high loads.

The advantage of the approach being proposed here lies in the fact that the overlapping of the opening times of the intake valves and exhaust valves translates into improved scavenging of the residual gas out of the combustion chambers of the internal combustion engine, which brings about a better filling of the combustion chambers as well as a higher rotational speed of the turbine of the turbocharger, as a result of which the torque of the internal combustion engine can be raised. At high scavenging rates and taking into consideration the fact that rendering the combustion air mixture richer is limited by the ignition conditions or by the formation of soot, a leaner-than-stoichiometric exhaust gas can be established. Metering fuel into the exhaust gas duct upstream from the first three-way catalytic converter can generate a stoichiometric exhaust gas that can be efficiently purified by means of the three-way catalytic converter. This translates into an effective exhaust-gas purification, especially into an effective reduction of the nitrogen oxides that are formed during the scavenging mode of operation, and this is achieved by means of the first three-way catalytic converter, also when the internal combustion engine is using the scavenging mode of operation.

The measures outlined in the dependent claims allow advantageous refinements of the method indicated in the independent claim.

During the aftertreatment of the stoichiometric exhaust gas by means of the first three-way catalytic converter, the exhaust gas—in other words, the mixed exhaust gas consisting of the engine exhaust gas and the metered-in fuel—flows into and through the three-way catalytic converter which, with its three-way catalytic coating, effectuates the catalytic conversion of unburned hydrocarbons (HC), carbon monoxide (CO) and nitrogen oxides ($NO_x$).

According to a refinement of the method, it is provided for a second three-way catalytic converter to be arranged in the exhaust gas duct upstream from the first three-way catalytic converter, whereby the fuel is metered into the exhaust gas duct at a place between the second three-way catalytic converter and the first three-way catalytic converter. Since, during the scavenging mode of operation, unburned hydrocarbons (HC) are also fed into the exhaust gas duct along with the scavenging air, these unburned hydrocarbons can be exothermically converted on the second catalytic converter. Since the fuel fed into the exhaust gas duct by the injection valve is also converted exothermically on the first three-way catalytic converter, the two exothermic reactions are distributed over both catalytic converters, and this prevents thermal damage or premature ageing of one of the three-way catalytic converters.

According to another refinement of the method, it is provided for a lambda probe to be installed downstream from the first three-way catalytic converter, whereby the volume of fuel metered through the injection valve is regulated by the lambda probe. Since the precise mass of fresh air in the combustion chambers of the internal combustion engine cannot be detected using measuring techniques, the combustion-air ratio is controlled by the position of the throttle valve and by the volume of fuel injected. In order to prevent the combustion-air ratio from having to be excessively enriched during the scavenging mode of operation, which can lead to elevated particle emissions and can cause damage to the components of the three-way catalytic converter due to the exothermic conversion of unburned constituents, the air-fuel ratio is selected in such a manner that a lean, leaner-than stoichiometric exhaust gas-air ratio is established during the scavenging mode of operation. As a result, however, the nitrogen oxide emissions ($NO_x$ emissions) can no longer be effectively reduced by the three-way catalytic converter. Owing to the lambda probe installed downstream from the first three-way catalytic converter, the volume of fuel injected by the injection valve arranged in the exhaust gas duct can be regulated in such a manner that a stoichiometric exhaust gas-air ratio is established in the exhaust gas duct upstream from the first three-way catalytic converter, thus promoting an efficient exhaust-gas purification by means of the first three-way catalytic converter.

According to another refinement of the method, it is provided for the compressor to be driven by a turbine in the exhaust gas duct. Thanks to a turbine in the exhaust gas duct, it is possible to dispense with a mechanical or electric drive for the compressor, as a result of which the efficiency of the internal combustion engine is not detrimentally affected. A compressor and a corresponding pressure gradient between the intake duct of the internal combustion engine and the exhaust gas duct of the internal combustion engine are necessary so that the overlapping of the valve opening times during the scavenging mode of operation can be utilized to achieve an efficient scavenging of the combustion chambers and so as to prevent exhaust gas that is coming out of the exhaust gas duct from returning to the combustion chambers.

In this context, it is particularly advantageous for the fuel to be metered into the exhaust gas duct downstream from the turbine and upstream from the first three-way catalytic converter. If the fuel is metered upstream from the turbine, as a secondary effect, an exothermic conversion of the fuel with the residual oxygen in the exhaust gas duct occurs, as a result of which energy for driving the turbine is additionally made available. However, for purposes of the exhaust-gas purification, it makes sense to only meter in the fuel downstream from the turbine since this secondary effect does not take place there and thus the requisite volume of fuel can be more precisely adapted to the residual oxygen present in the exhaust gas duct.

According to the invention, an internal combustion engine having a device for exhaust-gas aftertreatment is being put forward which has a variable valve control unit, especially a camshaft timing control unit, with which the opening times of the intake valves and/or exhaust valves can be changed, also having a compressor to supply fresh air to the internal combustion engine as well as having an exhaust gas duct, whereby, in the direction of flow of the exhaust gas through the exhaust gas duct, a first three-way catalytic converter is arranged in the exhaust gas duct downstream from the outlet of the internal combustion engine, whereby an injection valve that serves to feed fuel into the exhaust gas duct is arranged downstream from the outlet and upstream from the first three-way catalytic converter, whereby the internal combustion engine is configured to carry out a method for exhaust-gas aftertreatment as described above. The method described above can be executed by such a device, so that an efficient exhaust-gas aftertreatment can be performed by means of the first three-way catalytic converter, even if the internal combustion engine is using the scavenging mode of operation.

According to an advantageous embodiment of the invention, it is provided for a second three-way catalytic converter to be arranged in the exhaust gas duct downstream from the outlet and upstream from the first three-way catalytic converter. As a result, a particularly effective exhaust-gas purification can be achieved since the second three-way catalytic converter heats up more quickly and thus more quickly reaches an operating temperature at which the catalytic effect needed for the exhaust-gas purification is attained.

According to an advantageous refinement, it is provided that at least one of the three-way catalytic converters is configured as a particulate filter having a three-way catalytically active coating. A particulate filter serves to additionally filter soot particles out of the exhaust gas. The three-way catalytically active coating on the particulate filter accounts for the exhaust-gas purifying effect of a three-way catalytic converter. Moreover, the fuel injection into the exhaust gas duct can also be utilized to heat up the exhaust gas in order to regenerate the particulate filter, so that here, no additional components are needed and the existing components can be employed to carry out the method according to the invention.

According to an advantageous refinement, it is provided for the second three-way catalytic converter to be arranged near the engine and for the first three-way catalytic converter to be arranged further away from the engine, especially in the undercarriage of the motor vehicle. In this context, the expression "near the engine" refers to an average exhaust-gas path of 50 cm at the maximum, especially 30 cm at the maximum, beyond the outlet of the internal combustion engine. Owing to this proximity to the internal combustion engine, the second three-way catalytic converter starts up particularly rapidly following a cold start, so that it also functions as a starting catalytic converter. In contrast, the arrangement of the first three-way catalytic converter further away from the engine prevents the catalytic converter from overheating and thus being thermally damaged by the exothermic reaction that is to take place. Moreover, there is a relatively large amount of space available in the undercarriage, so that the second three-way catalytic converter is easy to install. The expression "further away from the engine" refers to an average exhaust-gas path of at least 80 cm, especially at least 100 cm, beyond the outlet of the internal combustion engine.

According to another advantageous refinement, it is provided for lambda probes to be installed upstream from the second three-way catalytic converter, between the second three-way catalytic converter and the first three-way catalytic converter as well as downstream from the first three-way catalytic converter. In this manner, the air-fuel ratio as well as the exhaust-gas ratio at the first and second three-way catalytic converters can be regulated, so that, outside of the scavenging mode of operation, the air volume can be adapted in such a way that the two three-way catalytic converters—and, if applicable, additional components of the exhaust-gas aftertreatment system arranged in the exhaust gas duct—can purify the exhaust gas as well as possible.

Unless otherwise indicated in a specific case, the various embodiments of the invention cited in this application can be advantageously combined with each other.

BRIEF DESCRIPTION OF THE DRAWINGS

The invention will be explained below on the basis of embodiments with reference to the accompanying drawings. The following is shown.

DETAILED DESCRIPTION OF THE INVENTION

Figure 1:
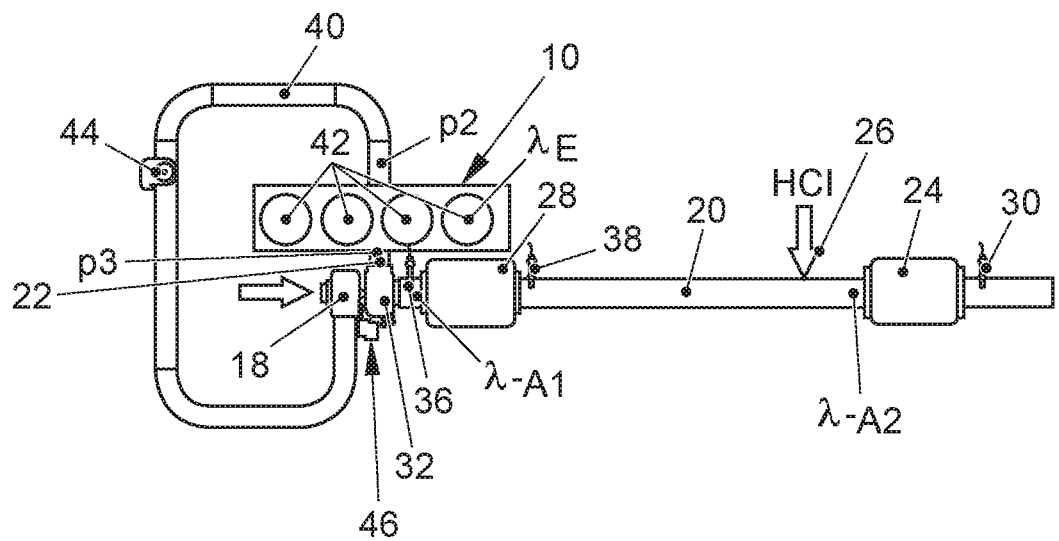
FIG. 1: an embodiment of an internal combustion engine with an intake pipe and an exhaust gas duct, for carrying out an exhaust-gas aftertreatment method according to the invention.
Figure 5:
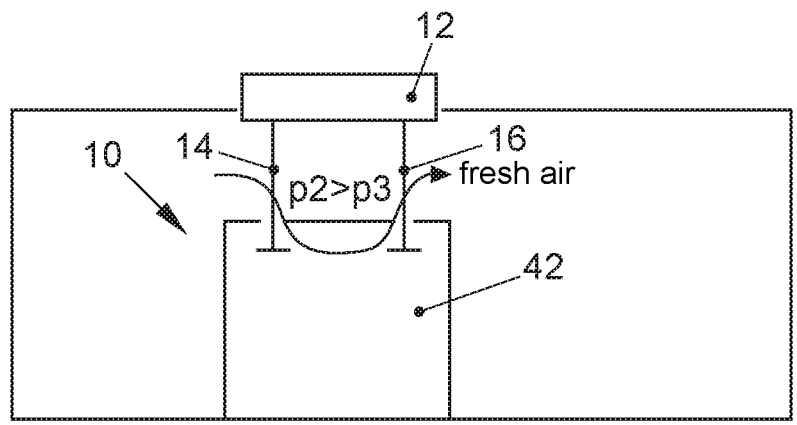
FIG. 5: a schematic diagram of a charged internal combustion engine as well as of a scavenging procedure in case of overlapping of the opening times of the intake and exhaust valves during the scavenging mode of operation.

FIG. 1 shows an internal combustion engine 10 with an intake pipe 40 as well as an exhaust gas duct 20. The internal combustion engine 10 is, for example, an externally ignited internal combustion engine charged by a turbocharger 46. In the intake pipe 40, there is a compressor 18 of the turbocharger 46 with which air at a pressure above the ambient pressure is conveyed into the combustion chambers 42 of the internal combustion engine. Furthermore, in the intake pipe, there is a throttle valve 44 by means of which the volume of air fed to the combustion chambers 42 can be regulated. A turbine 32 of the turbocharger 46, a second three-way catalytic converter 28 as well as a first three-way catalytic converter 24 are all arranged in the flow direction of an exhaust gas of the internal combustion engine 10 in the exhaust gas duct 20 that adjoins an outlet 22 of the combustion chambers 42 of the internal combustion engine 10. The combustion chambers 42 of the internal combustion engine 10 can be closed by means of intake valves 14 and exhaust valves 16 that are shown in FIG. 5 and that can be opened in order to change the charge of a combustion mixture in the combustion chamber 42. An injection valve 26 that serves to meter fuel into the exhaust gas duct 20 is arranged in the exhaust gas duct 20 downstream from the second three-way catalytic converter 28 and upstream from the first three-way catalytic converter 24, in the direction of flow of the exhaust gas. In this context, the first three-way catalytic converter 24 is preferably arranged in the undercarriage of a motor vehicle, whereas the second three-way catalytic converter 28 is arranged near the engine. A lambda probe 30 that serves to regulate the volume of fuel fed in via the injection valve 26 is provided downstream from the first three-way catalytic converter 24. Additional lambda probes 36, 38 by means of which the combustion-air ratio $\lambda_E$ of the internal combustion engine 10 can be regulated are arranged upstream as well as downstream from the second three-way catalytic converter 28.

Figure 4:
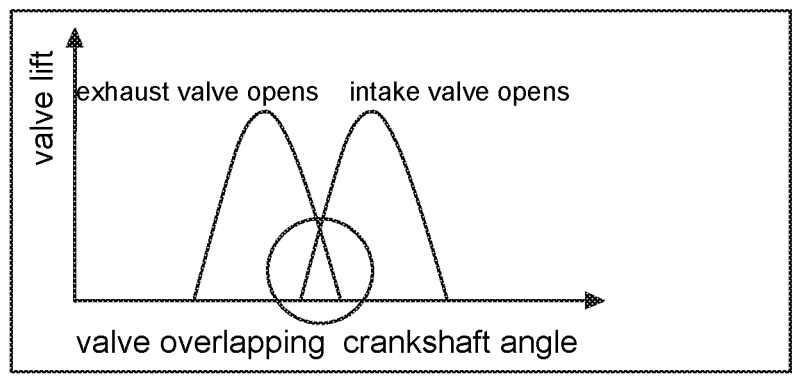
FIG. 4: a schematic diagram of the opening and closing of the intake and exhaust valves as well as of the overlapping of the valve opening times during the scavenging mode of operation of the internal combustion engine.

During operation of the internal combustion engine 10, air is drawn in through the intake pipe 40 and compressed by the compressor 18 so that a boost pressure p2 is established in the intake pipe 40 upstream from the intake valves 14. The boost pressure p2 is greater than a pressure p3 in the exhaust gas duct 20 downstream from the exhaust valves 16 (exhaust-gas counter-pressure). During the scavenging mode of operation of the internal combustion engine 10, the opening times of the intake valves 14 and exhaust valves 16 are changed in such a way by a valve control unit 12 depicted in FIG. 5 that the opening times of the intake valves 14 and exhaust valves 16 overlap (valve overlapping). In this context, the intake valves 14 already open before the exhaust valves 16 have closed. Owing to the pressure gradient p2>p3 between the intake pipe 40 and the exhaust gas duct 20, the combustion chambers 42 are scavenged with fresh gas since fresh air can flow via the intake valves 14 into the combustion chamber 42 and from there, directly through the exhaust valves 16 into the exhaust gas duct 20. This brings about an improved residual gas scavenging, in other words, an improved discharge of burned gas from the combustion chamber 42, a greater filling of the combustion chambers 42 with fresh gas as well as a higher rotational speed of the turbine 32 of the turbocharger 46. This valve overlapping is shown in FIG. 4. The opening times of the intake valves 14 and exhaust valves 16 can be adjusted, for instance, by means of a camshaft timing control unit by turning the intake and/or exhaust camshaft in order to control the valves. The described method makes it possible to raise the torque of the internal combustion engine 10.

Since the precise mass of fresh air in the combustion chambers 42 of the internal combustion engine 10 cannot be detected using measuring techniques, the combustion-air ratio $\lambda_E$ in the combustion chambers 42 is controlled by the position of the throttle valve 44 and by the volume of fuel injected into the combustion chambers 42 of the internal combustion engine 10. In order to prevent the mixture in the combustion chambers 42 from being too rich, an exhaust-gas ratio $\lambda_{A1}>1$, in other words, an excess of oxygen is established in the exhaust gas duct 20 downstream from an outlet 22 of the internal combustion engine 10. With this lean exhaust gas-air ratio, nitrogen oxide emissions can no longer be reduced by a three-way catalytic converter 24, 28. In order to establish a stoichiometric exhaust-gas ratio $\lambda_{A2}=1$ at the inlet of the first three-way catalytic converter 24, fuel (HC) is injected into the exhaust gas duct 20 upstream from the first three-way catalytic converter 24 and downstream from the second three-way catalytic converter 28. The volume of injected fuel can be regulated by a lambda probe 30 located downstream from the first three-way catalytic converter 24. Owing to the stoichiometric exhaust-air ratio, all of the gaseous toxic emissions of the exhaust gas can be effectively converted by means of the first three-way catalytic converter 24.

Figure 2:
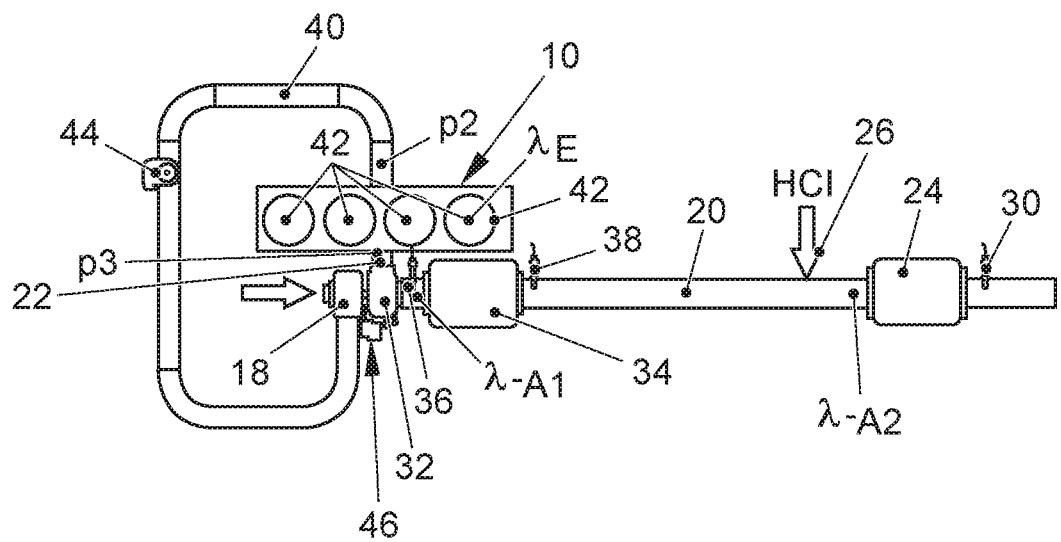
FIG. 2: another embodiment of an internal combustion engine with an intake pipe and an exhaust gas duct, for carrying out an exhaust-gas aftertreatment method according to the invention.

FIG. 2 shows an alternative embodiment of an internal combustion engine 10 according to the invention, having a device for carrying out an exhaust-gas aftertreatment. With a largely identical structure, the second three-way catalytic converter 28 is configured as a particulate filter 34 having a three-way catalytically active coating. This allows not only an efficient exhaust-gas purification, but also allows soot particles to be captured. In this context, the internal combustion engine 10 can be operated with a lean mixture in order to regenerate the particulate filter 34, and fuel can be metered into the exhaust gas duct 20 downstream from the particulate filter 34 in order to obtain a stoichiometric exhaust gas at the first three-way catalytic converter 24, whereby the exhaust gas can then be purified by the first three-way catalytic converter 24.

Figure 3:
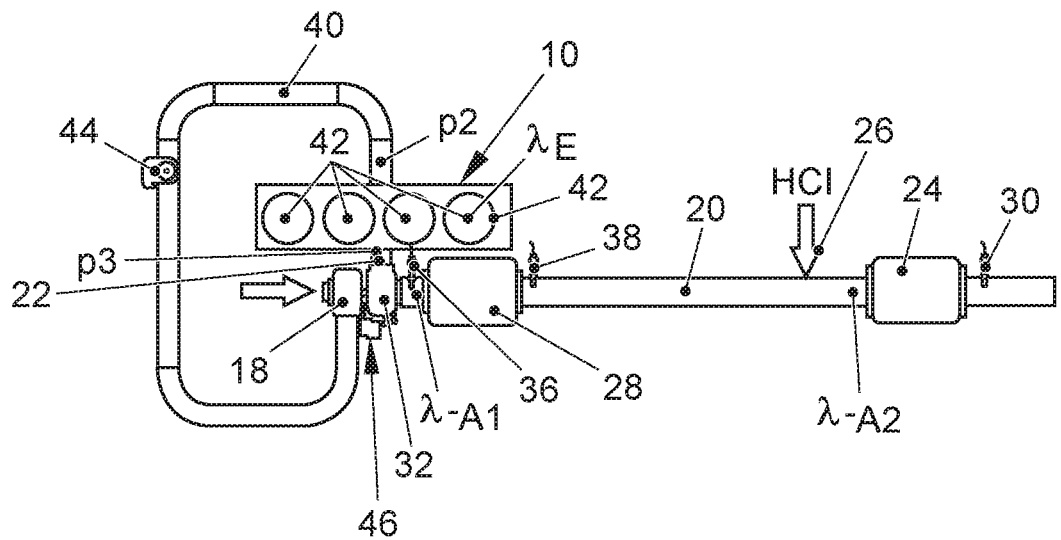
FIG. 3: another embodiment of an internal combustion engine with an intake pipe and an exhaust gas duct, for carrying out an exhaust-gas aftertreatment method according to the invention.

As an alternative, as shown in FIG. 3, the first three-way catalytic converter 24 can be configured as a particulate filter 34 having a three-way catalytically active coating. In this context, the injection valve 26 and the metering of the fuel at an operating point other than the scavenging mode of operation can be utilized to heat up the exhaust gas duct 20, thus allowing a regeneration of the particulate filter 34.

LIST OF REFERENCE NUMERALS 10 internal combustion engine
12 valve control unit
14 intake valve
16 exhaust valve
18 compressor
20 exhaust gas duct
22 outlet
24 first three-way catalytic converter
26 injection valve
28 second three-way catalytic converter
30 lambda probe
32 turbine
34 particulate filter
36 lambda probe
38 lambda probe
40 intake pipe
42 combustion chambers
44 throttle valve
46 turbocharger
$\lambda_E$ air-fuel ratio
$\lambda_{A1}$ exhaust-air ratio before the HC metering
$\lambda_{A2}$ exhaust-air ratio after the HC metering
HC hydrocarbons
p2 pressure in the intake pipe upstream from the intake valves/boost pressure
p3 pressure in the exhaust gas duct downstream from the exhaust valves/exhaust-gas counter-pressure

The invention claimed is:

1. A method for the exhaust-gas aftertreatment of an internal combustion engine, whereby the internal combustion engine is supplied with fresh air by means of a compressor driven by a turbine in an exhaust duct, the internal combustion engine has an adjustable valve control unit for intake valves and/or exhaust valves, and the internal combustion engine is connected to the exhaust gas duct, a first three-way catalytic converter is arranged in the exhaust gas duct, a second three-way catalytic converter is arranged in the exhaust gas duct upstream from the fist three-way catalytic converter and downstream from the turbine, and an injection valve that serves to feed fuel into the exhaust gas duct is arranged in the exhaust gas duct downstream from the second three-way catalytic converter and upstream from the first three-way catalytic converter, in the direction of flow of the exhaust gas, said method comprising the following steps:
   operating the internal combustion engine in a scavenging mode,
   introducing a leaner-than-stoichiometric exhaust gas into the exhaust gas duct,
   metering fuel into the exhaust gas duct downstream from the second three-way catalytic converter and upstream from the first three-way catalytic converter so that a stoichiometric exhaust gas is established at an inlet of the first three-way catalytic converter, and
   aftertreating the stoichiometric exhaust gas by means of the first three-way catalytic converter.

2. The method according to claim 1, wherein a lambda probe is installed downstream from the first three-way catalytic converter, whereby the volume of fuel metered through the injection valve is regulated by the lambda probe.

3. The method according to claim 1, wherein the step of metering fuel into the exhaust gas duct comprises metering said fuel into the exhaust gas duct downstream from the turbine and upstream from the first three-way catalytic converter.

4. An internal combustion engine having a device for exhaust-gas aftertreatment, comprising:
   a variable valve control unit with which the opening times of the intake valves and/or exhaust valves of the internal combustion engine can be changed, wherein the variable valve control unit is configured to operate the internal combustion engine in a scavenging mode to establish a leaner-than-stochiometric exhaust gas,
   a compressor to supply fresh air to the internal combustion engine, an exhaust gas duct in which, in the direction of flow of the exhaust gas, wherein the compressor is driven by a turbine in the exhaust gas duct, wherein a first three-way catalytic converter is arranged downstream from the outlet of the internal combustion engine, wherein the first three-way catalytic converter is configured to aftertreat the stoichiometric exhaust gas, wherein a second three-way catalytic converter is arranged in the exhaust gas duct upstream from the first three-way catalytic converter and downstream from the turbine, wherein an injection valve that serves to feed fuel into the exhaust gas duct is arranged in the exhaust gas duct downstream from the second three-way catalytic converter and upstream from the first three-way catalytic converter, wherein the injection valve is configured to meter fuel into the exhaust gas duct downstream from the second three-way catalytic converter and upstream from the first three-way catalytic converter so that a stoichiometric exhaust gas is established at an inlet of the first three-way catalytic converter.

5. The internal combustion engine according to claim 4, wherein at least one of the three-way catalytic converters is configured as a three-way catalytically active coating on a particulate filter.

6. The internal combustion engine according to claim 4, wherein the second three-way catalytic converter is arranged near the engine, and the first three-way catalytic converter is arranged further away from the engine.

7. The internal combustion engine according to claim 4, wherein lambda probes are installed upstream from the second three-way catalytic converter, between the second three-way catalytic converter and the first three-way catalytic converter as well as downstream from the first three-way catalytic converter.

* * * * *